Feb. 13, 1934.  B. DE MATTIA  1,947,335
VULCANIZING PRESS
Filed Dec. 17, 1929    4 Sheets-Sheet 2

INVENTOR.
Barthold De Mattia
BY Munson, Kennedy, & Campbell
ATTORNEYS.

Feb. 13, 1934.   B. DE MATTIA   1,947,335
VULCANIZING PRESS
Filed Dec. 17, 1929   4 Sheets-Sheet 3
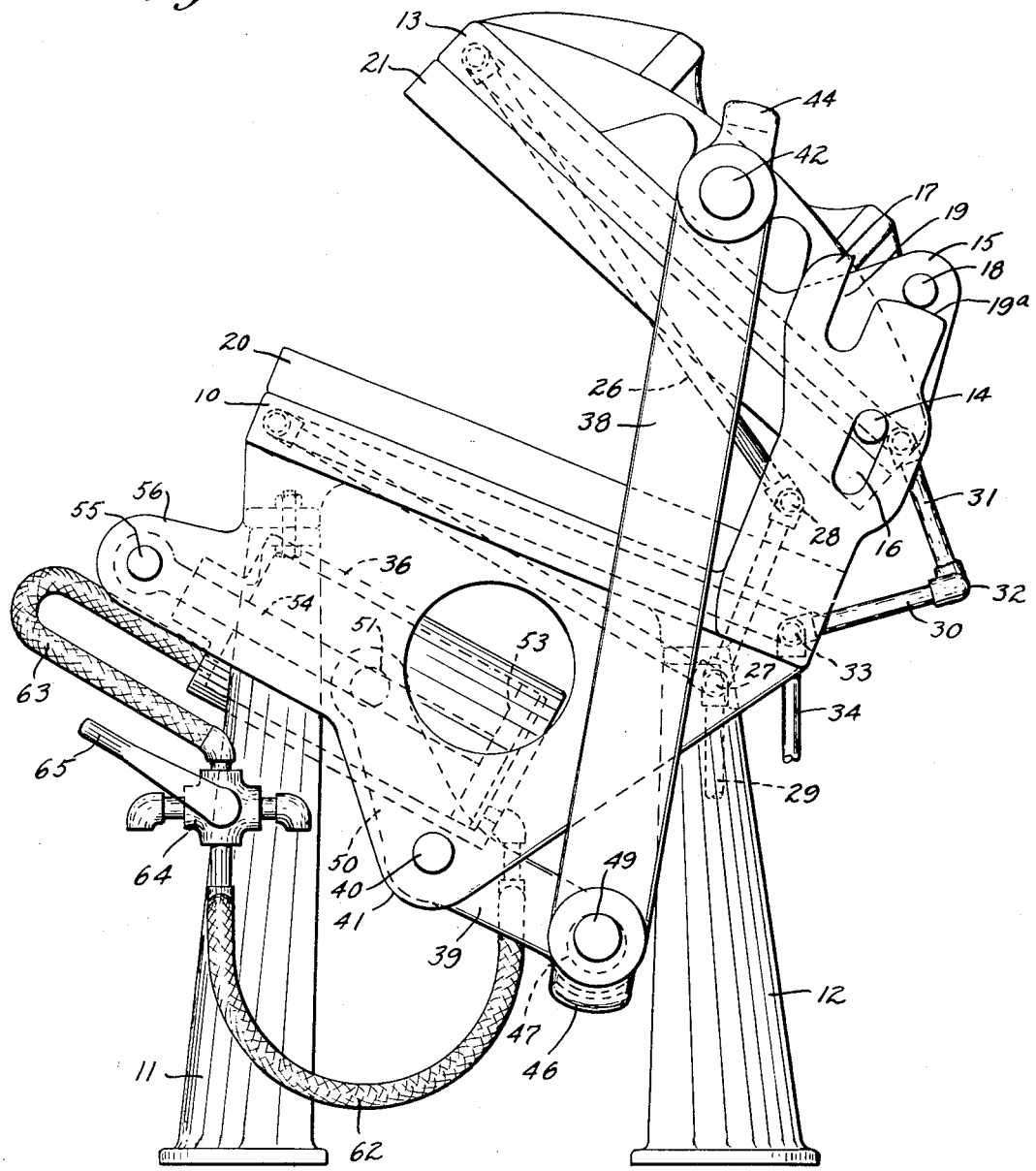

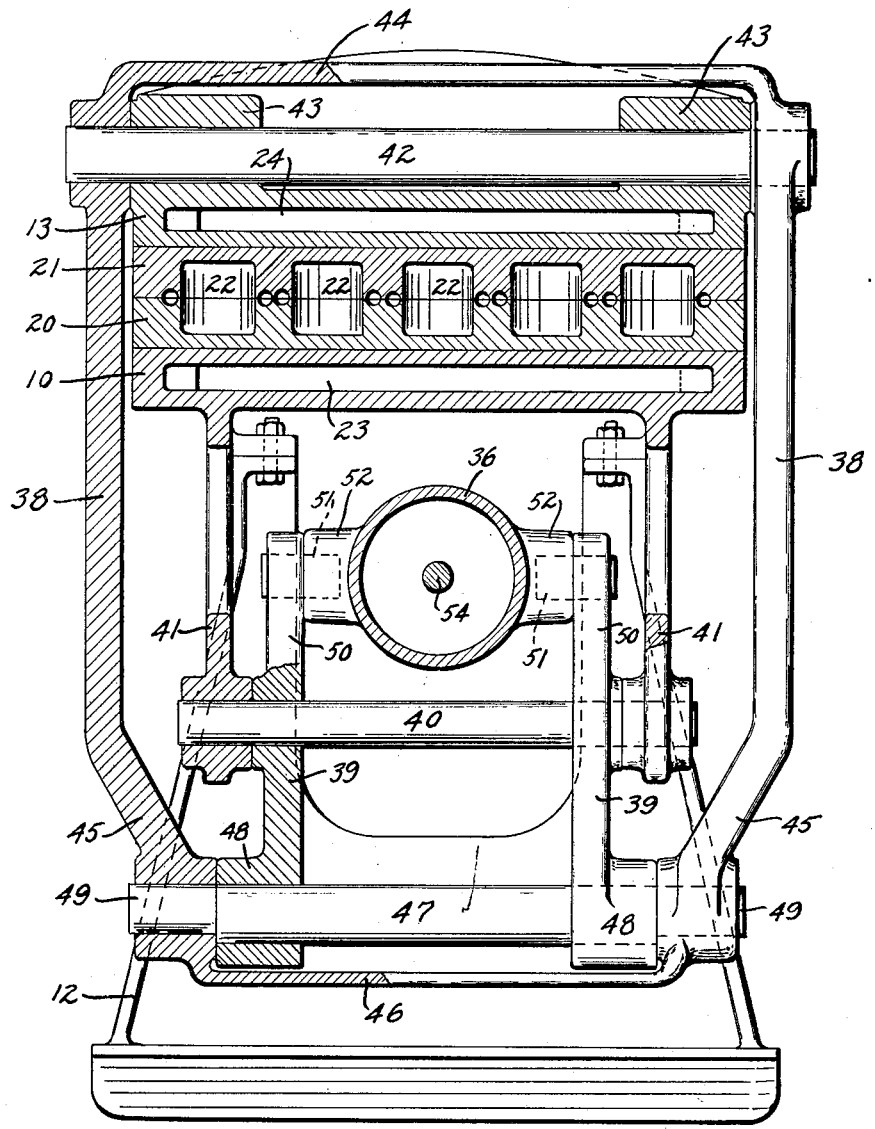

Patented Feb. 13, 1934

1,947,335

UNITED STATES PATENT OFFICE 1,947,335

VULCANIZING PRESS

Barthold De Mattia, Passaic, N. J.

Application December 17, 1929
Serial No. 414,649

2 Claims. (Cl. 18—17)

This invention relates to vulcanizing apparatus and refers particularly to vulcanizing molds or presses for use in the manufacture of various kinds of articles which are formed either wholly or partly of rubber, such for instance as articles known in the rubber industry as "mechanical goods".

An important feature of the invention is the provision of a vulcanizing mold or press with a pair of opposed platens, one of which is hinged so as to be movable toward and from the other in opening and closing the press but which is capable in its initial opening and its final closing movement of a straight parallel motion with reference to the fixed platen to facilitate the seating and unseating of the articles in and from the mold cavities.

Another feature of the invention is to provide such a vulcanizing mold or press with a novel and simplified power mechanism for opening and closing the press, and for tightly clamping the movable platen in closed position.

These and other features and advantages of the invention will readily appear from the following description in connection with the accompanying drawings wherein one form of the invention has been shown by way of illustration, and wherein Fig. 1 is a side elevation, partly in section, of the improved vulcanizing press in closed condition;

Fig. 3 is a side elevation of the press with the upper platen in its fully opened position; and Fig. 4 is a vertical transverse sectional view taken approximately on the line 4—4 of Fig. 1.

Figure 1:
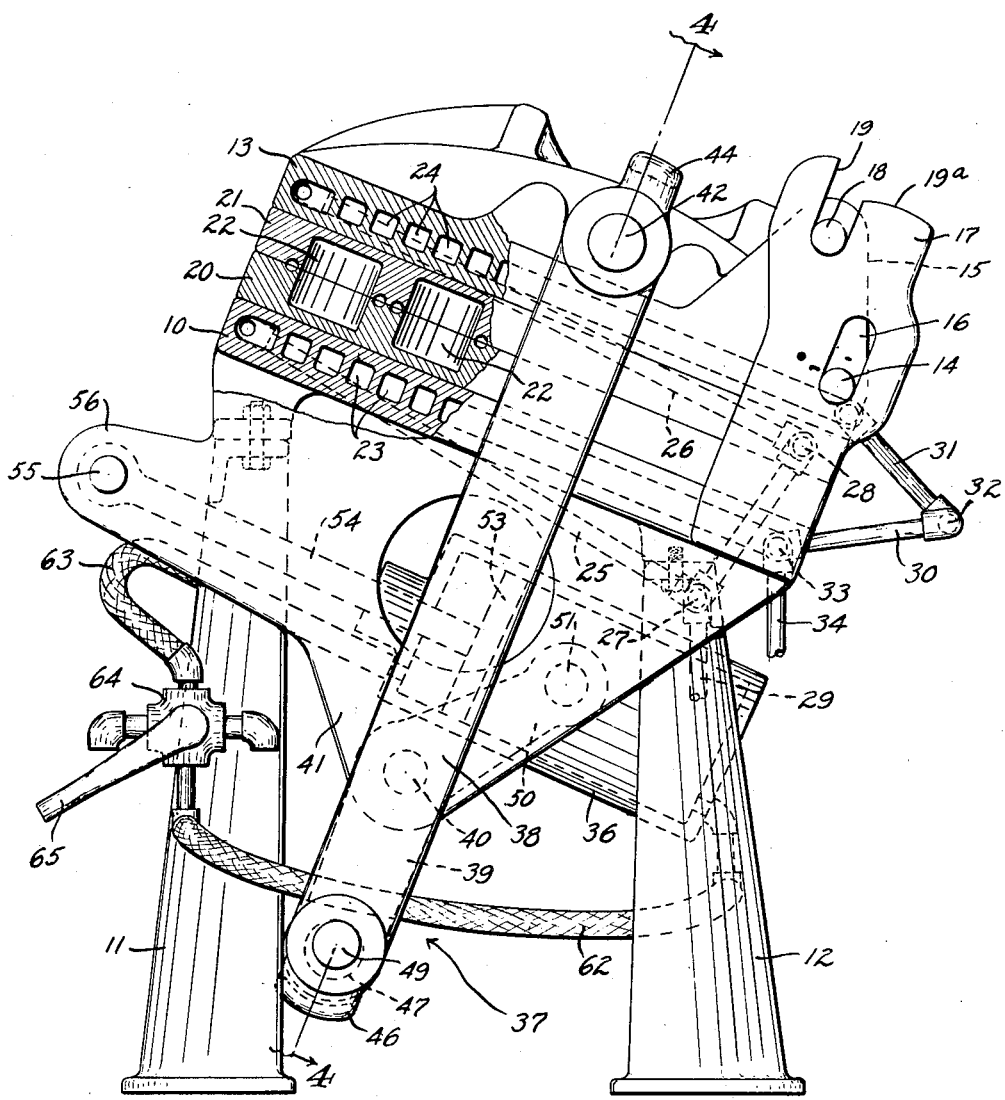

The improved vulcanizing press comprises a lower fixed platen or bed 10, which is supported upon suitable leg or base members 11 and 12, and an upper swinging platen or bed 13, which is pivotally connected to the lower platen 10 by means of shiftable or floating pintles or hinge pins 14. These hinge pins 14 extend outwardly from lugs 15 at the opposite sides of the platen 13 and are movable in slots 16 formed in upward extensions 17 of the lower platen 10, said slots 16 being substantially perpendicular to the opposing faces of the platens 10 and 13. Guide pins 18 also extend laterally from the upper ends of the lugs 15 and are movable in notches 19 arranged parallel with the slots 16 and which serve to maintain the upper platen 13 in parallel relation to the fixed platen 10 during portions of its opening and closing movements. Rearward of the notches 19, the upper edges of the extensions 17 are arcuately formed as at 19ª, concentric with the upper ends of the slots 16, so that when the pins 14 reach the upper ends of the slots 16, the guide pins 18 can swing rearwardly over and upon the edges 19ª.

Mold sections 20 and 21 are supported by the respective platens 10 and 13, being detachably secured thereto as by cap screws or the like, not shown, and these mold sections have their meeting faces formed with mold cavities 22 within which the rubber articles to be vulcanized are confined. It will be understood, of course, that the form or shape of the mold sections or the mold cavities will vary according to the articles to be vulcanized.

Although the mold sections may be provided with individual heating chambers, if desired, those in the illustrated embodiment are heated by the circulation of steam or other heating medium through chambers 23 and 24 formed directly in the platens 10 and 13, respectively. Steam is supplied to said chambers 23 and 24 through suitable pipes 25 and 26 which have swivel joints at 27 and 28 connecting them with a common, fixed supply pipe 29, and similarly, the condensation or exhaust steam may be drawn from said chambers 23 and 24 through pipes 30 and 31 having swivel joints 32 and 33 which connect them with a common, fixed drain pipe 34.

It is to be observed that the platens 10 and 13 are inclined downwardly from front to rear, this arrangement being intended to facilitate the drainage of condensation from the steam chambers 23 and 24 and thus to insure a more uniform heating of the mold sections and the contained articles.

The upper platen 13 is swung to its opened and closed positions, by a pressure cylinder 36 acting indirectly upon the platen 13 through the medium of a toggle system or mechanism designated generally by the reference character 37. This toggle system comprises a pair of relatively long links 38 arranged at opposite sides of the press to straddle both of the platens, and a pair of short links 39 arranged below the fixed platen 10 and pivoted thereto by means of a shaft 40 which is journaled in the lower ends of depending webs 41 arranged at the opposite sides of the press.

The upper ends of the long links 38 are pivotally attached to the upper platen 13 by means of a shaft 42 which extends transversely through suitable journal portions 43 at the upper side of said platen, and preferably said links are permanently tied together at their upper ends by an integral connecting web or cross-bar 44 which serves to equalize the strains imposed on the links. The lower ends of the links 38, which are inwardly offset as at 45 to terminate below the side edges of the platen 10, are likewise tied together by an integral connecting web or cross-bar 46, as well as by a transverse shaft 47.

This shaft 47 also extends through the lower ends 48 of the short links 39, and has its opposite ends 49, in the lower ends of the links 38, eccentrically formed so as to provide an adjustment between the links 38 and 39 whereby to vary the clamping pressure which is exerted by the toggle system. It is to be noticed that when the press is closed, as shown in Fig. 1, the links 38 and 39 are substantially in a straight line, so that they will impose a powerful clamping action on the platens and resist opening movement during the vulcanizing operation.

Above the shaft 40, the links 39 are provided with extension arms 50, the upper ends of which carry trunnions 51 which are rotatably mounted in bosses 52 formed at diametrically opposite sides of the pressure cylinder 36 intermediate the ends thereof, the cylinder extending in a fore and aft direction between said arms 50. Disposed within the cylinder 36, there is a piston 53, which is secured to the rearward end of a piston rod 54 having its forward end pivotally anchored at 55 between extensions 56 at the front of the lower fixed platen 10, said piston rod extending through a stuffing box 57 on the front cylinder head 58.

Fluid pressure, such as steam, compressed air, or water, is admitted to and exhausted from the opposite ends of the cylinder 36 through pipes 60 and 61, which are connected by lengths of flexible hose 62 and 63 to a four-way cock or valve 64. This valve 64 has been illustrated as of a conventional type having a ported rotary plug which can be turned by means of a handle 65 to control the supply and exhaust of the pressure fluid to and from the cylinder 36.

When the press is closed, as shown in Fig. 1, the cylinder 36 is at the rearward end of its movement, and the links 38 and 39 are straightened substantially on "dead center" as previously explained. In this condition of the press the hinge pins 14 are at the lower ends of the slots 16, and the guide pins 18 are disposed in the lower ends of the notches 19. In opening the press, the attendant turns the valve handle 65 through an arc of substantially 90°, which admits pressure fluid through the hose 63 and pipe 61 to the front end of the cylinder 36, and opens the rear end of the cylinder to the exhaust line through the pipe 60 and hose 62. The cylinder 36 thereupon moves forwardly upon the piston rod 54 and acts through the trunnions 51 and extension arms 50 to rock the short links 39 in a counter-clockwise direction about the axis of the shaft 40. This movement breaks the toggle joint and causes the lower connected ends of the links 38 and 39 to swing rearwardly and upwardly, thereby moving the upper platen 13 away from the lower fixed platen 10.

Figure 2:
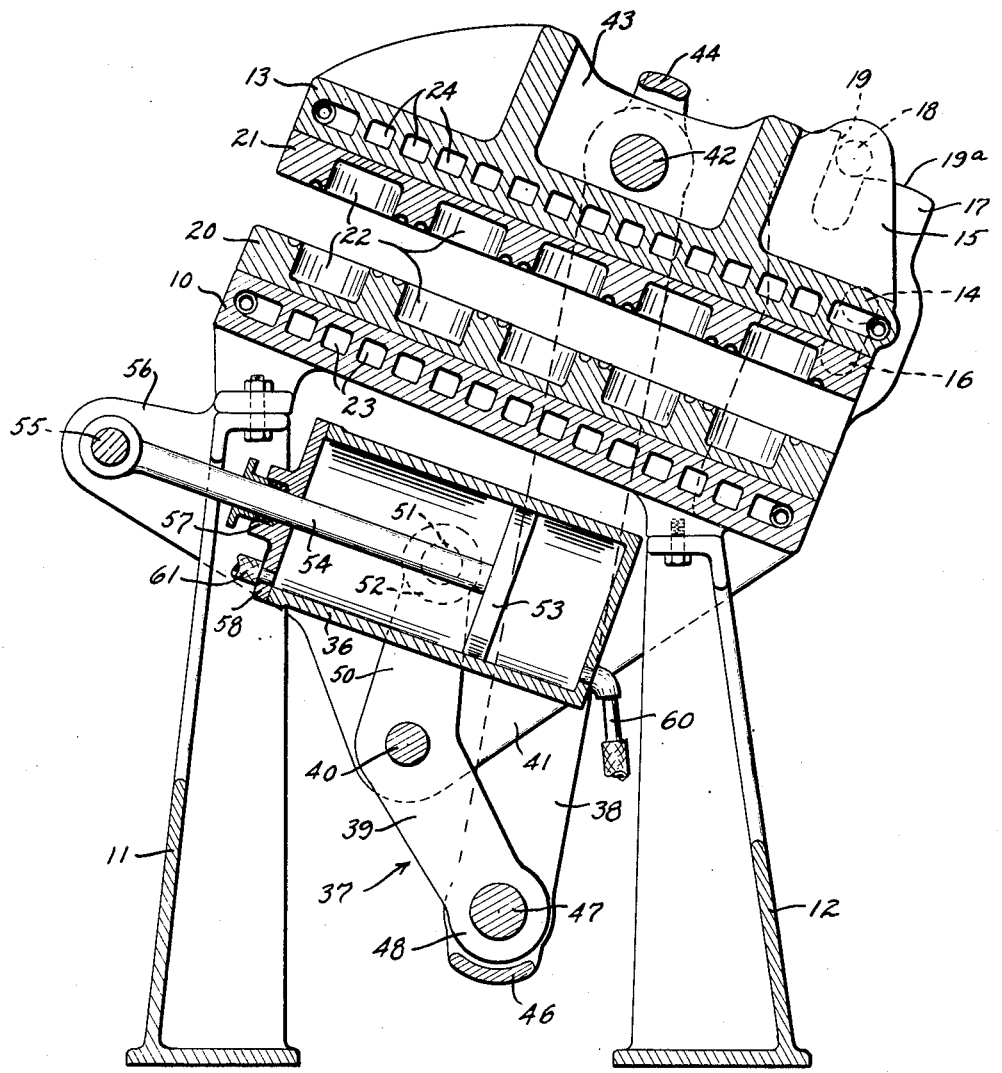
Fig. 2 is a vertical longitudinal sectional view through the same, partly open.

In the initial or mold-breaking movement of the upper platen, the pins 14 and 18 maintain a parallel relationship between the platens until the pins 18 reach the upper open ends of the slots 19, and this takes place at substantially the same time that the hinge pins 14 reach the upper ends of the slots 16 (see Fig. 2). Thereafter, the continued upward movement of the links 38 causes the upper platen 13 to swing in an arcuate path about the axis of the arrested hinge pins 14 until the cylinder 36 reaches the limit of its forward movement (see Fig. 3). The mold cavities 22 are now fully accessible so that the attendant can remove the vulcanized articles therefrom and replace them with other articles to be vulcanized in the next operation.

In closing the press the foregoing operations are substantially reversed. That is to say, the attendant actuates the valve handle 65 so as to admit pressure fluid to the rear end of the cylinder 36 and exhaust the forward end thereof. The cylinder thereupon moves bodily rearward, rocking the short toggle links 39 in a clockwise direction about the axis of the shaft 40 and drawing the long toggle links 38 forwardly and downwardly to close the press. In the initial closing movement, the upper platen 13 swings about the axis of the hinge pins 14, which at the time are at the upper ends of the slots 16, under the guiding influence of the pins 18 which by the same movement of the platen approach and finally register with the open notches 19 of the fixed platen (compare the showing of Figs. 3 and 2).

In the latter condition of the parts, the two platens occupy a parallel relation to each other, and this relation is maintained during the remainder of the closing movement of the platen 13, due to the combined action of the hinge pins 14, guide pins 18 and the long toggle links 38. As the toggle links 38 and 39 approach a straight line or dead center relationship, the upper platen is moved straight downwardly in the manner stated and subjected to the full clamping pressure exerted by the extended toggle in response to the power applied thereto by the pressure cylinder, thereby locking the opposed mold sections together in firm unyielding contact. Overthrow of the toggles is prevented by the abutment of the lower ends of the links 38 against the rear edges of the leg members 11 as shown in Fig. 1, or by any other desired form of stops.

In the initial opening movement, the toggle exerts its greatest power, sufficient to break the adhesion between the mold sections, and preferably the mold is so arranged or initially treated that the vulcanized articles remain in the lower mold section from which they can, after the press is opened, be easily removed either by hand or by an automatic stripping or ejecting mechanism. The parallel motion of the upper platen is of great importance in molding articles with substantially straight sides, because such motion permits the necessary straight draft. Obviously, if the upper platen had only an arcuate swinging motion, the molded articles would not be free to draw from the cavities 22 of the upper mold section, but would in fact bind and would probably be damaged in the opening operation. Conversely, the parallel movement of the upper platen facilitates proper entry of the unvulcanized articles into the upper mold cavities as the press is closed.

The inclination of the press platen is also an important feature in that it makes possible the perfect circulation of the heating fluid in the chambers 23 and 24, and precludes the retention of condensation at any point in the system.

From the foregoing it will be evident that an improved vulcanizing press has been provided with a novel movement of one platen to permit straight withdrawal of the vulcanized articles from the mold cavities. The improved press also is provided with a simplified power mechanism for opening and closing the press and for clamping the movable platen tightly in closed position.

The invention is of course susceptible of numerous modifications in the details of construction and arrangements of parts, and the right is herein reserved to make such changes as fall within the scope of the appended claims without departing from the spirit of the invention. For instance, instead of hinging the upper platen in the manner shown and described, it may be mounted otherwise so as to be movable into and out of cooperative relation with the fixed platen after the movable platen has completed its straight parallel movement with reference to the fixed platen.

Having thus described my invention, what I claim is:

1. A vulcanizing press comprising a pair of opposed platens, one fixed and the other movable, extensions at the opposite sides and adjacent the rear edge of the fixed platen, said extensions being each provided with a pair of parallel slots which are substantially perpendicular to the opposing faces of the platens and one of said slots in each extension being open at one end while the other slot in each extension is closed, hinge pins extending laterally from the movable platen and disposed in the closed slots of said extensions, guide pins also extending laterally from the movable platen and adapted for movement into and out of the open-ended slots, and means for moving said movable platen to open and close the press.

2. A vulcanizing press comprising a pair of opposed platens, one fixed and the other pivoted, a toggle system acting directly on the pivoted platen to open and close the press and to clamp the pivoted platen tightly in closed position, means for maintaining the pivoted platen in parallel relation to the fixed platen during its inital opening and final closing movements while permitting it to swing arcuately during the remainder of its movements, fluid pressure means operative in opposite directions on said toggle system to open and close the press at the proper time, said fluid pressure means including a pressure cylinder connected directly to and bodily movable with the toggle system, and a cooperating piston anchored against longitudinal movement but free to rock with the cylinder as the latter moves.

BARTHOLD DE MATTIA.